Jan. 3, 1950     J. W. WABER     2,493,047
PNEUMATIC TIRE
Filed May 22, 1947     2 Sheets-Sheet 1
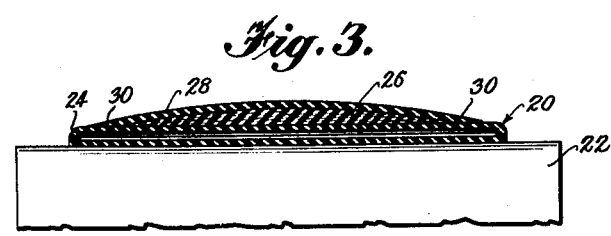
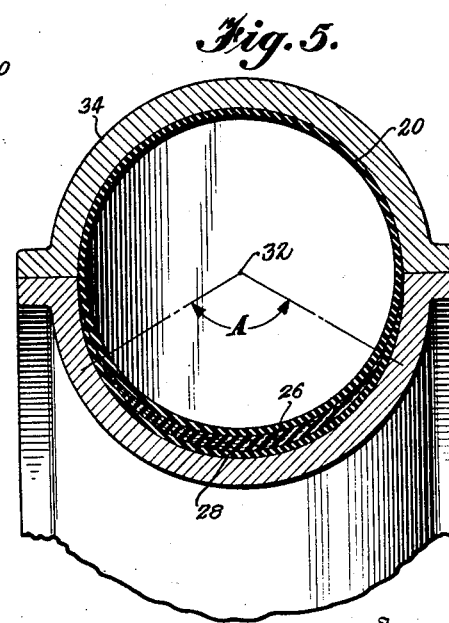
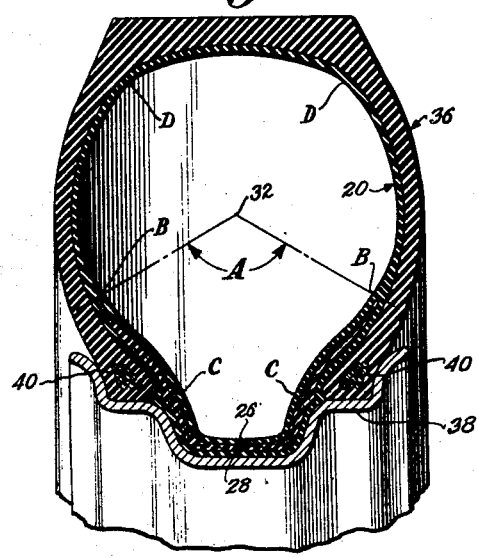
Inventor
James W. Waber
By Raymond W. Colton
Attorney Jan. 3, 1950   J. W. WABER   2,493,047
PNEUMATIC TIRE
Filed May 22, 1947                                      2 Sheets-Sheet 2
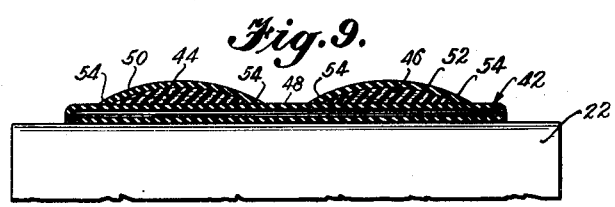
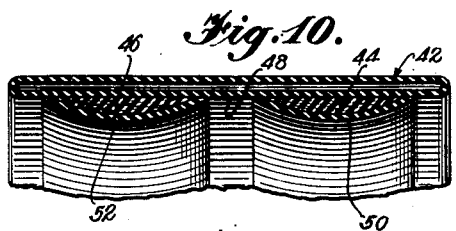
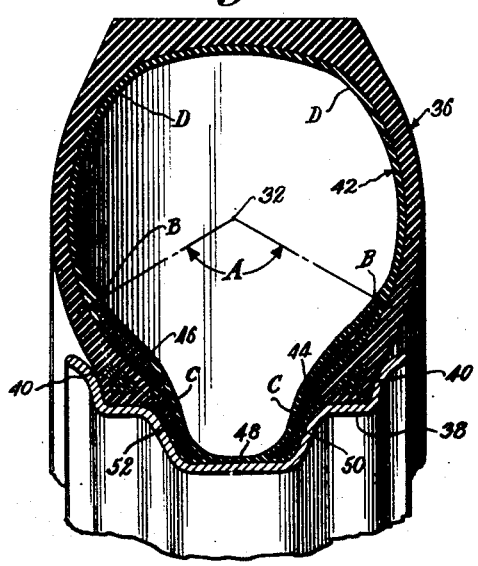
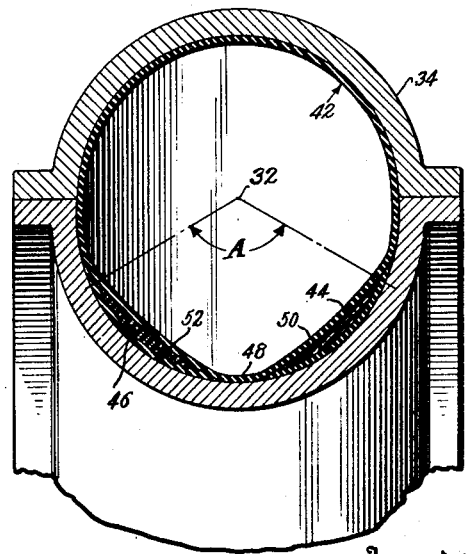
Inventor
James W. Waber
By Raymond W. Colton
Attorney

UNITED STATES PATENT OFFICE 2,493,047

PNEUMATIC TIRE

James W. Waber, Chicago, Ill.

Application May 22, 1947, Serial No. 749,665

26 Claims. (Cl. 154—15)

One of the most frequent single causes of failure of pneumatic tires, and one that has apparently been neglected throughout the history of the art, is what is commonly known as "rim pinch." Although this source of trouble has existed from the earliest days of the inner tube, and has been extremely costly from the standpoints of personal injury and damage to property, its effects have been increased rather than reduced by a number of the developments of recent years. The use of reduced pressures in balloon and semi-balloon tires, the adoption of the drop-center rim, the trend towards wider base rims, and the applications of synthetic rubber have contributed appreciably to the dangers and frequency of rim pinch; and although manufacturers in the automotive and tire industries have studied the problems at length, neither they nor the thousands engaged in tire maintenance and repair, nor the millions of vehicle operators have come forward with a satisfactory solution. Such expedients as the use of liners on the one hand, and increasing the tube thickness at the rim and bead zones on the other, have often delayed the failures of tubes from this cause, but never satisfactorily prevented them.

The art is replete with disclosures of so-called "puncture proof" tires and tubes, and the use of self-healing or self-sealing compositions at the inner and outer peripheries of inner tubes for this purpose may be found in many patents including those in the name of the present inventor, No. 1,808,091, dated June 2, 1931, and No. 2,161,490, dated June 6, 1939; but such concepts have been a far cry from the problems presented by casing bead injury and rim pinch. After many years of experience in the tire and tube art, supplemented by extended research on the specific problems presented by casing bead injury and rim pinch, the present inventor submitted applications for Letters Patent, Serial No. 532,333, now abandoned, filed April 22, 1944; Serial No. 575,-984, now abandoned, filed February 3, 1945; and Serial No. 586,119, filed April 2, 1945 now abandoned; of which this application is deemed to be a continuation-in-part.

When an inner tube of standard construction is completely inflated within a rim mounted casing, it is expanded until it assumes the size and shape of the chamber defined by the rim and casing, the outer wall of the tube ultimately conforming to the internal walls of the chamber so defined. During the initial stages of its expansion, the tube receives a substantially toroidal form until its tread and side wall zones bear upon the corresponding zones of the casing with sufficient force to restrain further expansion in these zones. Further distension of the tube then occurs principally in the bead and rim zones with the result that the tube wall in these zones undergoes an appreciably greater degree of stretching than that experienced in its tread and side wall zones. Consequently the wall thickness of a standard inflated tube becomes substantially less at the rim and bead zones. Continued inflation exerts progressively greater stretch upon progressively diminishing portions of the tube, so that frequently, localized areas reach conditions of high stress and even rupture. Yet it is in these highly stressed zones that the toes of the casing beads engage the rim and define relatively sharply converging annular grooves which the tube walls must fill; it is here that the greatest relative movement between the casing and rim is experienced in service; and it is here that rust and other destructive influences are so often encountered. Hence, it is small wonder that it is here, due to repeated flexure of portions of the tube wall under excessive tension, fatigue, the primary cause of the trouble, produces the effect known as rim pinch.

It is towards the solution of these problems that this invention is directed, and based upon the tubes and methods of producing the same conceived by the present inventor, the motoring public can at last be spared the anguish to which it has been subjected these many decades because of the ever present dangers of the effects of casing bead injury and rim pinch.

The objects of this invention are achieved by interposing a body of easily displaceable unvulcanizable plastic composition, which may also possess self-healing or sealing characteristics, between the air chamber of the inner tube and the chamber defined by the wheel rim and casing so that the composition bridges the junction of the bead and rim zones, the easily displaceable permanently flowable composition conforming to the irregularities such as the rather sharp annular grooves defined at the bead and rim joints, promoting substantially uniform stresses upon the air confining wall of an inflated tube in these zones and thus obviating sharp bending and excessive distortion of the air confining wall of the tube. The plastic composition though always displaceable to fulfill its function, is preferably confined in a general way to its circumferential position with respect to the generatrix axis of the tube, by securing to the tube wall beyond the edges of the plastic material, a covering strip or annulus of vulcanizable resilient material similar in composition to that constituting the tube itself, defining with the original tube wall, a closed pocket confining the composition. The covering strip is preferably secured to the tube wall by vulcanization, and according to this invention the plastic composition and its covering strip are applied externally to the tube wall.

The plastic composition extends, from portions of the tube cross-section displaced by not less than 90° with respect to the generatrix axis of the tube, the preferred angle being approximately or at least 120° towards the rim zone. The composition is preferably symmetrically disposed with respect to the rim zone, and in the form of one or more annuli. The annular body or bodies of plastic composition may be substantially uninterrupted or may assume the form of two spaced annuli, dictated in part by service conditions to be encountered and the characteristics of the tire casing with which it is employed.

The method of producing inner tubes of the type contemplated herein comprises supporting an endless tubular vulcanizable body with its inner periphery displaced from its normal position and exposed in substantially flattened condition, applying an annular layer of unvulcanizable easily displaceable plastic composition to at least a portion of the exposed periphery, shifting the body until its inner periphery assumes its normal inner peripheral position and curing the product thus formed. The plastic composition is so located as to bridge the bead and rim zones of the finished tube, and in some instances, completely cover these zones. The extent of the plastic composition for certain applications will approximate one-third of the perimeter of the tube so as to cover approximately 120° of the tube with respect to its generatrix axis under conditions of inflation. A vulcanizable cover strip for confining the plastic composition in a general way, is preferably secured to the tube wall to cover the composition while the inner periphery thereof is displaced. The amount of such displacement preferably approximates 180° with respect to the generatrix axis of the tube. After the assembly has been completed and the tube shifted to its normal position, the tube is inflated in a suitable mold and cured under conditions promoting vulcanization of the vulcanizable components.

It is contemplated that spaced annular layers of the unvulcanizable easily displaceable plastic composition be applied in lieu of a single one for certain applications. Such spaced annuli will nevertheless bridge the junctions of the bead and rim zones and partially cover these zones, and may extend from portions of the exposed periphery to which they are applied, displaced by approximately one-third of the perimeter of the tube (approximately 120° with respect to the generatrix axis of the tube when inflated) towards the rim zone. Where spaced annuli of the composition are employed, spaced cover strips are also preferably used, likewise secured to the tube wall beyond the composition while the inner periphery is displaced. Here again, after the composite tube is shifted to its normal position, it will be inflated in a suitable mold for curing under vulcanizing conditions.

A more complete understanding of the invention will follow from a detailed description of the steps involved as depicted in the accompanying drawings, wherein:

Figs. 1 to 5 are fragmentary sectional elevations depicting progressive stages of the production of one form of tube contemplated by this invention;

Fig. 6 is a fragmentary sectional elevation depicting the assembly of a tube of the type formed in accordance with the method steps of Figs. 1 to 5, combined with a rim and casing;

Figs. 7 to 11 inclusive, are fragmentary sectional elevations depicting progressive stages of the production of a modified form of tube contemplated by this invention; and Fig. 12 is a fragmentary sectional elevation depicting the assembly of a tube of the type formed in accordance with the method steps of Figs. 7 to 11, combined with a rim and casing.

The endless vulcanizable tube 20 is preformed in accordance with any of the methods known in the art, and mounted on a support 22 in substantially collapsed condition with its exposed periphery 24, actually the inner periphery of the ultimate inner tube, outwardly disposed for application of a body of plastic material thereto.

To such portion of the exposed periphery 24 as represents approximately one-third of the perimeter of the tube, there is applied a preformed layer of unvulcanizable easily displaceable plastic composition 26, so disposed with respect to the tube periphery as to bridge the junction of the casing beads and rim with which the tube is intended for use.

A vulcanizable cover strip 28 which may also be preformed is then superimposed over the plastic composition to confine the same in a general way within a pocket defined between the previously exposed surface 24 and the proximate surface of the cover strip. The edges 30 of the cover strip extend beyond the plastic composition for direct application to the surface 24 of the tube to which they are secured.

The composite tube thus formed is then removed from the support 22 and shifted with respect to its generatrix axis 32, depicted in Fig. 5, so that the inner periphery of the tube including the plastic composition assumes its normal inner peripheral position as depicted in Fig. 4. The tube is then placed in a sectional mold 34 and inflated through a suitably located valve, or by means of a hollow needle penetrating the unvulcanizable easily displaceable plastic composition where the latter possesses self-sealing or self-healing properties. After inflation in this mold, the tube is cured under vulcanizing conditions which result in the establishment of such a bond between the edges of the cover strip 28 and the wall of the original tube as to render them unitary. Whereas the plastic composition is confined in the pocket formed between the cover strip and the original tube, within this pocket, the composition is freely flowable under normally encountered temperature conditions so that it will become displaced in much the manner depicted in Fig. 6 where the tube has been entirely inflated to conform to the chamber defined by the casing 36 and the rim 38 with which the tube is assembled. Under these conditions of assembly, it will be noted that the plastic composition extends through an arc A of substantially 120° approximately symmetrically with respect to the plane of the generatrix axis, to assume a position substantially coextensive with the bead zones BC and the rim zone CC as depicted in Fig. 6. It will be noted from this figure that rather sharply converging annular grooves are defined at the junctions of the rim 38 with the beads 40 of the casing. Ordinarily with inner tubes of standard construction these sharp annular grooves are filled by portions of the tube wall itself, which in these zones becomes relatively thin, since the frictional engagement between the partialy inflated tube in the side wall zones BD and tread zone DD with the internal casing wall greatly restricte further stretching of the tube in the side wall and tread zones. In the present case, however, these sharp annular grooves are occupied by portions of the wall of the cover strip 28, and due to the easily displaceable nature of the plastic composition 26, the air confining wall of the tube 20 in these zones is relatively uniformly stressed and of substantially constant thickness, lacking any sharp bends. Accordingly when, under conditions of service, the tube of the present application is subjected to flexure and relative movement between the casing and rim, there is practically no fatigue effect upon the air confining wall of the tube, and accordingly, no danger of rim pinch. Even should the outer wall defined by the cover strip 28 become broken, the characteristics of the plastic composition 26 will prevent damage to the air confining wall of the tube.

Figs. 7 to 11 inclusive, depict method steps similar to those described with reference to Figs. 1 to 5 inclusive in producing a tube 42 having two annular bodies 44 and 46 of unvulcanizable displaceable plastic composition, confined upon a surface 48 of the tube which is exposed outwardly during assembly but which ultimately becomes the inner periphery of the tube. These plastic annuli are confined to the surface of the tube wall by means of cover strips 50 and 52 respectively, extending over and beyond the plastic annuli, the edges 54 of these cover strips being secured to the exposed surface 48 of the tube to define therewith annular pockets within which the plastic composition is easily displaceable to conform to any irregularities encountered in use.

The plastic composition not only compensates for irregularities, but also serves to distribute any force imposed thereon over a large area and thereby further serves to avoid fatigue and rim pinch.

Now referring to Fig. 10 of the drawings, the composite tube thus formed, still in substantially flattened condition, is removed from the support 22 upon which it was formed and shifted through an angle of 180° with respect to its generatrix axis 32, thereby assigning the normal position to the inner periphery. The article of Fig. 10 is then placed in a sectional mold 34, inflated and cured under vulcanizable conditions. During the vulcanizing operation, the edges of the cover strips 50 and 52 will be firmly bonded to the outer wall of the original tube, producing a substantially unitary relationship therebetween to define the pockets which confine the plastic composition.

A tube of this type assembled with a rim 38 and casing 36 is shown in Fig. 12, which distinguishes from the showing of Fig. 6 primarily in having two annuli of the plastic composition bridging the junctions of the casing beads 40 and the rim. Thus in this case, the plastic composition is discontinuous in the rim zone CC. Here again, the angle A by which the remote portions of the plastic composition are displaced, is shown as an angle of approximately 120°, symmetrical with respect to the plane of the generatrix axis.

Whereas this angle of 120° is not critical so long as the location of the plastic composition is such that the junctions of the casing beads with the rim are so completely bridged that there will be no opportunity for rim pinch to occur, this angle is approximately the largest one necessary to serve the purpose in conjunction with the vast majority of installations currently employed. Accordingly this angle might be substantially smaller or larger, depending upon the dimensions and relationships occurring between tire casings and rims.

Whereas the composition of the unvulcanizable easily displaceable plastic composition may vary appreciably, an example of such a composition, representing a successful application is:

| | Per cent |
|---|---|
| Rubber #1 smoke sheets | 40 |
| Tube reclaim (no free sulphur) | 42 |
| Rosin oil | 18 |

A suitable composition, by way of example. which may be used for the inner tube itself and for the cover strip for confining the plastic composition, may be as follows:

| | Parts |
|---|---|
| Rubber (smoked sheets) | 100.00 |
| Stearic acid | 1.00 |
| Trimethyl - dihydroquinoline (Agerite Resin D) | 2.00 |
| Zinc oxide | 5.00 |
| Soft carbon (P33) | 40.00 |
| Sulfur | 0.75 |
| Mercaptobenzothiazole (Captax) | 0.75 |
| Benzothiazyl disulfide (Altax) | 0.75 |
| Tetramethylthiuram disulfide (Tuads) | 0.25 |
| Tellurium (Telloy) | 0.50 |

The initial tube to which the plastic compositions and cover strips are applied may be vulcanized or unvulcanized at the time the layers are applied, since the ultimate conditions to which the composite tube is subjected can be used to effect vulcanization of this component as well.

The plastic annuli may be extruded in the form of strips of suitable length having crescent-like cross sections such as those depicted in Figs. 5 and 11. The cover strips may likewise be extruded or otherwise preformed with suitable cross sectional configurations to cover the plastic annuli so that their edges may be secured to the outer wall of the initial tube.

It will be clear from the foregoing that in the inner tube of the present invention, the easily displaceable plastic composition actually undergoes definite displacement in service as an essential feature of the performance of its function, as contrasted with prior art disclosures of plastic inserts for other purposes definitely positioned to retain assigned forms with respect to their tube walls. Due to such displacement of the plastic composition under service conditions in the present case, its cross section in use will necessarily vary appreciably from that initially assigned thereto.

Whereas the method has been described as applied to two types of tubes, it will be understood by those skilled in the art as it has been recognized by the present inventor, that the method is more widely applicable and the specific examples set forth herein should not be regarded as restrictive beyond the scope of the appended claims.

I claim:

1. A method of producing an inner tube for pneumatic tires comprising supporting an endless tubular vulcanizable body with its inner periphery displaced from its normal position and exposed in substantially flattened condition, applying an annular layer of unvulcanizable easily displaceable plastic composition to at least a portion of said exposed periphery, shifting said body until said inner periphery assumes its normal position, and curing the product thus formed.

2. A method of producing an inner tube for pneumatic tires comprising supporting an endless tubular vulcanizable body with its inner periphery displaced from its normal position and exposed in substantially flattened condition, applying an annular layer of unvulcanizable easily displaceable plastic composition to bridge the bead and rim zones of said exposed periphery, shifting said body until said inner periphery assumes its normal position, and curing the product thus formed.

3. A method of producing an inner tube for pneumatic tires comprising supporting an endless tubular vulcanizable body with its inner periphery displaced from its normal position and exposed in substantially flattened condition, applying an annular layer of unvulcanizable easily displaceable plastic composition to cover the bead and rim zones of said exposed periphery, shifting said body until said inner periphery assumes its normal position, and curing the product thus formed.

4. A method of producing an inner tube for pneumatic tires comprising supporting an endless tubular vulcanizable body with its inner periphery displaced from its normal position and exposed in substantially flattened condition, applying an annular layer of unvulcanizable easily displaceable plastic composition to a portion of said exposed periphery approximating one-third of the perimeter of said body, shifting said body until said inner periphery assumes its normal position, and curing the product thus formed.

5. A method of producing an inner tube for pneumatic tires comprising supporting an endless tubular vulcanizable body with its inner periphery displaced from its normal position and exposed in substantially flattened condition, applying an annular layer of unvulcanizable easily displaceable plastic composition to at least a portion of said exposed periphery, securing a vulcanizable cover strip to said body to confine said composition, shifting said body until said inner periphery assumes its normal position, and curing the product thus formed.

6. A method of producing an inner tube for pneumatic tires comprising supporting an endless tubular vulcanizable body with its inner periphery displaced from its normal position and exposed in substantially flattened condition, applying an annular layer of unvulcanizable easily displaceable plastic composition to at least a portion of said exposed periphery, applying an annular vulcanizable cover strip to said body over said composition, shifting said body until said inner periphery assumes its normal position, and curing the product thus formed.

7. A method of producing an inner tube for pneumatic tires comprising supporting an endless tubular vulcanizable body with its inner periphery displaced from its normal position and exposed in substantially flattened condition, applying an annular layer of unvulcanizable easily displaceable plastic composition to at least a portion of said exposed periphery, shifting said body until said inner periphery assumes its normal position, inflating said body in a mold, and curing the product thus formed.

8. A method of producing an inner tube for pneumatic tires comprising supporting an endless tubular vulcanizable body with its inner periphery displaced from its normal position and exposed in substantially flattened condition, applying an annular layer of unvulcanizable easily displaceable plastic composition and a vulcanizable cover strip therefor to at least a portion of said exposed periphery, shifting said body until said inner periphery assumes its normal position, inflating said body, and curing the product thus formed.

9. A method of producing an inner tube for pneumatic tires comprising supporting an endless tubular vulcanizable body with its inner periphery displaced from its normal position and exposed in substantially flattened condition, applying an annular layer of unvulcanizable easily displaceable plastic composition to at least a portion of said exposed periphery, shifting said body until said inner periphery assumes its normal position, inflating said body, and curing the product thus formed under vulcanizing conditions.

10. A method of producing an inner tube for pneumatic tires comprising supporting an endless tubular vulcanizable body with its inner periphery displaced approximately 180° with respect to its generatrix axis from its normal position and exposed in substantially flattened condition, applying an annular layer of unvulcanizable easily displaceable plastic composition to at least a portion of said exposed periphery, shifting said body until said inner periphery assumes its normal position, and curing the product thus formed.

11. A method of producing an inner tube for pneumatic tires comprising supporting an endless tubular vulcanizable body with its inner periphery displaced from its normal position and exposed in substantially flattened condition, applying spaced annular layers of unvulcanizable easily displaceable plastic composition to portions of said exposed periphery, shifting said body until said inner periphery assumes its normal position, and curing the product thus formed.

12. A method of producing an inner tube for pneumatic tires comprising supporting an endless tubular vulcanizable body with its inner periphery displaced from its normal position and exposed in substantially flattened condition, applying spaced annular layers of unvulcanizable easily displaceable plastic composition to bridge the bead and rim zones of said exposed periphery, shifting said body until said inner periphery assumes its normal position, and curing the product thus formed.

13. A method of producing an inner tube for pneumatic tires comprising supporting an endless tubular vulcanizable body with its inner periphery displaced from its normal position and exposed in substantially flattened condition, applying spaced annular layers of unvulcanizable easily displaceable plastic composition to spaced portions of the rim and bead zones of said exposed periphery, shifting said body until said inner periphery assumes its normal position, and curing the product thus formed.

14. A method of producing an inner tube for pneumatic tires comprising supporting an endless tubular vulcanizable body with its inner periphery displaced from its normal position and exposed in substantially flattened condition, applying spaced annular layers of unvulcanizable easily displaceable plastic composition from portions of said exposed periphery displaced by approximately one-third of the perimeter of said body towards its rim zone, shifting said body until said inner periphery assumes its normal position, and curing the product thus formed.

15. A method of producing an inner tube for pneumatic tires comprising supporting an endless tubular vulcanizable body with its inner periphery displaced from its normal position and exposed in substantially flattened condition, applying spaced annular layers of unvulcanizable easily displaceable plastic composition to portions of said exposed periphery, securing vulcanizable cover strips to said body to confine said composition, shifting said body until said inner periphery assumes its normal position, and curing the product thus formed.

16. A method of producing an inner tube for pneumatic tires comprising supporting an endless tubular vulcanizable body with its inner periphery displaced from its normal position and exposed in substantially flattened condition, applying spaced annular layers of unvulcanizable easily displaceable plastic composition to portions of said exposed periphery, applying annular vulcanizable cover strips to said body over said composition, shifting said body until said inner periphery assumes its normal position, and curing the product thus formed.

17. A method of producing an inner tube for pneumatic tires comprising supporting an endless tubular vulcanizable body with its inner periphery displaced from its normal position and exposed in substantially flattened condition, applying spaced annular layers of unvulcanizable easily displaceable plastic composition to portions of said exposed periphery, shifting said body until said inner periphery assumes its normal position, inflating said body in a mold, and curing the product thus formed.

18. A method of producing an inner tube for pneumatic tires comprising supporting an endless tubular vulcanizable body with its inner periphery displaced from its normal position and exposed in substantially flattened condition, applying spaced annular layers of unvulcanizable easily displaceable plastic composition and vulcanizable cover strips therefor to portions of said exposed periphery, shifting said body until said inner periphery assumes its normal position, inflating said body, and curing the product thus formed.

19. A method of producing an inner tube for pneumatic tires comprising supporting an endless tubular vulcanizable body with its inner periphery displaced from its normal position and exposed in substantially flattened condition, applying spaced annular layers of unvulcanizable easily displaceable plastic composition to portions of said exposed periphery, shifting said body until said inner periphery assumes its normal position, inflating said body, and curing the product thus formed under vulcanizing conditions.

20. A method of producing an inner tube for pneumatic tires comprising supporting an endless tubular vulcanizable body with its inner periphery displaced approximately 180° with respect to its generatrix axis from its normal position and exposed in substantially flattened condition, applying spaced annular layers of unvulcanizable easily displaceable plastic composition to portions of said exposed periphery, shifting said body until said inner periphery assumes its normal position, and curing the product thus formed.

21. The method of constructing an inner tube for pneumatic tires which consists in forming an endless annular basic tube of rubber-like material, applying to the inner periphery of said tube a generally crescent-shaped layer of unvulcanizable plastic easily displaceable compound and a cover layer of rubber-like material thereover, the edges of said cover layer extending beyond said easily displaceable compound and into engagement with said basic tube, the layer of easily displaceable material and said cover layer being sufficiently wide to overlap the opposed edges of a tire in which the tube is to be used, placing said tube structure in a mold, inflating said tube by forcing a gaseous substance thereinto and applying heat to said mold to vulcanize the said basic tube and said cover layer into an integral whole.

22. The method of constructing an inner tube for pneumatic tires which consists in forming an endless annular basic tube of rubber-like material, applying to the inner periphery of said tube a layer of unvulcanizable plastic easily displaceable compound and a cover layer of vulcanizable rubber-like material thereover, the edges of said cover layer extending beyond said easily displaceable compound and into engagement with said basic tube, the layer of easily displaceable material and said cover layer being sufficiently wide to overlap the opposed edges of a tire in which the tube is to be used, placing said tube structure in a mold, inserting a hollow needle through a perforation in said mold, said cover layer, said easily displaceable compound and said basic tube, inflating said tube by forcing a gaseous substance through said hollow needle into said tube and applying heat to said mold to vulcanize the said tube and said sheet into a unitary whole.

23. The method of constructing an inner tube for pneumatic tires which consists in forming an endless annular basic tube of rubber-like material, applying to the inner periphery of said tube a layer of unvulcanizable plastic easily displaceable compound and a cover layer of rubber-like material thereover, the edges of said cover layer extending beyond said easily displaceable compound and into engagement with said basic tube, the layer of easily displaceable material and said cover layer being sufficiently wide to overlap the opposed edges of a tire in which the tube is to be used, placing said tube structure in a mold of substantially the size and form of the cavity within the tire which the tube is to be employed, inserting a hollow needle through a perforation in said mold, said cover layer, said easily displaceable compound and said basic tube, inflating said tube by forcing a gaseous substance through said hollow needle into said tube and applying heat to said mold to unite the said tube and said sheet into a unitary whole.

24. The method of constructing an inner tube for pneumatic tires which consists in forming an endless annular basic tube of rubber-like material, applying to the inner periphery of said tube a layer of unvulcanizable plastic easily displaceable compound and a cover layer of rubber-like material thereover, the edges of said cover layer extending beyond said easily displaceable compound and into engagement with said basic tube, the layer of easily displaceable material and said cover layer being sufficiently wide to overlap the opposed edges of a tire in which the tube is to be used, placing said tube structure in a mold, inserting a hollow needle through a perforation in the mold, said cover layer, said compound and said basic tube, inflating said tube by forcing a gaseous substance thereinto and applying heat to said mold to unite the said basic tube and said cover layer into a unitary whole.

25. The method of making an inner tube by first forming an endless air container of vulcanizable rubber or similar material by any of the well known methods of making inner tubes for tires, applying to the inner periphery of the endless, vulcanizable, uninflated air container, a layer of plastic easily displaceable material so compounded that it will not become hard or vulcanized when subjected to heat, covering the easily displaceable compound with a sheet of vulcanizable material of sufficient width to contact the endless unvulcanized air container and entirely envelop the easily displaceable material, the layer of easily displaceable material and said cover layer being sufficiently wide to overlap the opposed edges of a tire in which the tube is to be used, injecting a fluid into said endless air container to partially inflate it, placing the partially inflated assembly in a mold, such as is used for vulcanizing inner tubes for tires, increasing the internal pressure in the tube by forcing more fluid thereinto until the assembly is held firmly against the interior of the mold, applying heat to the mold until the endless air container and the said sheet of vulcanizable material are permanently fixed to the size and shape of the interior of the mold by vulcanization, reducing the internal pressure in the said air container, and removing the air container assembly from the mold permanently fixed to the size and shape of the interior of the mold by vulcanization, except the easily displaceable material.

26. The method of making an inner tube free from the usual strains on the rim side by first forming a flat endless air container of vulcanizable rubber-like material by any of the well known methods of making inner tubes for tires, except there shall be no means for inflation provided, applying to the inner periphery of the endless vulcanizable air container a layer of plastic easily displaceable material so compounded that it will not become hard or vulcanized when subjected to heat, covering the easily displaceable material with a sheet of vulcanizable material of sufficient width to contact the endless unvulcanized air container beyond the easily displaceable compound and entirely envelop it, the layer of easily displaceable material and said cover layer being sufficiently wide to overlap the opposed edges of a tire in which the tube is to be used, penetrating to the hollow interior of the flat hollow vulcanizable endless air container by piercing the cover layer, the plastic layer and the endless air container, with a hollow instrument, injecting a fluid through the said hollow instrument to partially inflate the endless air container, placing the partially inflated assembly in a mold, such as is used in vulcanizing inner tubes for tires, increasing the internal pressure in the assembly by forcing more fluid material through the hollow instrument until the assembly is held firmly against the interior of the mold, applying heat to the mold until the said tube and said sheet of vulcanizable material are permanently fixed by vulcanization, reducing the internal pressure in said tube by permitting the fluid in the said tube to escape through the said hollow instrument, withdrawing the said hollow instrument from the tube assembly and removing the air container assembly from the mold, permently fixed to the size and shape of the interior of the mold by vulcanization, except the easily displaceable material which remains unvulcanized and closes the hole in the tube left when the said hollow instrument is removed from the tube assembly.

JAMES W. WABER.

REFERENCES CITED

The following references are of record in the file of this patent:

UNITED STATES PATENTS

| Number | Name | Date |
|---|---|---|
| 1,285,719 | Jeffries | Nov. 26, 1918 |
| 1,808,091 | Waber | June 2, 1931 |
| 1,818,349 | Ott | Aug. 11, 1931 |
| 1,930,182 | Richardson | Oct. 10, 1933 |
| 2,099,514 | Eberhard | Nov. 16, 1937 |
| 2,161,490 | Waber | June 6, 1939 |
| 2,283,183 | Carnahan | May 19, 1942 |